(12) United States Patent
Champlin et al.

(10) Patent No.: US 12,546,330 B2
(45) Date of Patent: Feb. 10, 2026

(54) BEARING ASSEMBLIES, APPARATUSES, DEVICES, SYSTEMS, AND METHODS INCLUDING BEARINGS

(71) Applicant: CHAMPIONX LLC, Sugar Land, TX (US)

(72) Inventors: Brett Champlin, Frederick, CO (US); Joey Witt, Frederick, CO (US); Brian Hicks, Frederick, CO (US); Alex Hageman, Frederick, CO (US)

(73) Assignee: CHAMPIONX LLC, Sugar Land, TX (US)

( * ) Notice: Subject to any disclaimer, the term of this patent is extended or adjusted under 35 U.S.C. 154(b) by 0 days.

(21) Appl. No.: 19/000,320

(22) Filed: Dec. 23, 2024

(65) Prior Publication Data

US 2025/0122882 A1 Apr. 17, 2025

Related U.S. Application Data

(63) Continuation of application No. 17/549,628, filed on Dec. 13, 2021, now Pat. No. 12,173,721.

(51) Int. Cl.
*F04D 29/041* (2006.01)
*F04D 1/06* (2006.01)
(Continued)

(52) U.S. Cl.
CPC .............. *F04D 29/041* (2013.01); *F04D 1/06* (2013.01); *F16C 17/02* (2013.01); *F16C 17/10* (2013.01); *F16C 33/043* (2013.01)

(58) Field of Classification Search
CPC ........ F04D 29/041; F04D 1/06; F04D 29/026; F04D 29/0413; F04D 29/0462;
(Continued)

(56) References Cited

U.S. PATENT DOCUMENTS 2,505,136 A * 4/1950 Moineau ............... F04C 2/1073
418/5
2,957,427 A * 10/1960 O'Connor ............. F04C 2/1073
406/96

(Continued)

FOREIGN PATENT DOCUMENTS

| DE | 29502434 U1 | 3/1995 |
| WO | 2001033083 A1 | 5/2001 |
| WO | 2020148091 A1 | 7/2020 |

OTHER PUBLICATIONS

API Plan 31, https://www.aesseal.com/en/resources/api-plans/api-plan-31, downloaded on Dec. 3, 2021, 4 pages.
(Continued)

*Primary Examiner* — Mark A Laurenzi
*Assistant Examiner* — Benjamin Doyle
(74) *Attorney, Agent, or Firm* — BKRIP LLC

(57) ABSTRACT

Bearing assemblies, apparatuses, systems, and methods include bearing assemblies having one or more bearing element in a bearing housing for supporting a shaft extending through at least a portion of the bearing housing. The bearing assembly including a recirculation line for delivering fluid into the bearing housing at a location separate from a fluid inlet of the bearing housing to at least partially thermally regulate, lubricate, and/or flush the one or more bearing elements during operation of the shaft.

20 Claims, 8 Drawing Sheets

(51) Int. Cl.
*F16C 17/02* (2006.01)
*F16C 17/10* (2006.01)
*F16C 33/04* (2006.01)

(58) Field of Classification Search
CPC ............... F04D 29/0473; F04D 29/061; F04D 29/4293; F04D 13/10; F04D 29/046; F04D 3/00; F04D 29/0465; F04D 29/5806; F16C 17/02; F16C 17/10; F16C 33/043; F16C 37/00; F16C 2206/56; F16C 2360/44; F16C 17/26
USPC .......................................................... 418/48
See application file for complete search history.

(56) References Cited

U.S. PATENT DOCUMENTS

| | | | | |
|---|---|---|---|---|
| 3,128,712 | A * | 4/1964 | Sence | F04D 13/0613 |
| | | | | 417/357 |
| 3,186,513 | A * | 6/1965 | Dunn | F16C 32/064 |
| | | | | 415/12 |
| 3,267,869 | A * | 8/1966 | Vartapetov | F04D 3/00 |
| | | | | 415/199.5 |
| 3,364,866 | A * | 1/1968 | Sato | F04D 29/061 |
| | | | | 417/365 |
| 5,549,465 | A * | 8/1996 | Varadan | F04C 2/1073 |
| | | | | 418/48 |
| 5,779,434 | A * | 7/1998 | De Long | F04D 29/061 |
| | | | | 415/121.2 |
| 6,461,115 | B1 * | 10/2002 | Ferrier | F04D 29/4293 |
| | | | | 417/360 |
| 7,520,720 | B2 * | 4/2009 | Welch | F04D 29/628 |
| | | | | 415/206 |
| 7,866,418 | B2 * | 1/2011 | Bertagnolli | C04B 37/001 |
| | | | | 175/420.2 |
| 7,870,913 | B1 * | 1/2011 | Sexton | F16C 33/26 |
| | | | | 384/95 |
| 8,016,571 | B2 | 9/2011 | Speer | |
| 8,246,251 | B1 * | 8/2012 | Gardner | F04D 29/606 |
| | | | | 384/420 |
| 10,036,398 | B2 | 7/2018 | St. John | |
| 10,260,517 | B2 * | 4/2019 | Juarez Ortega | F04D 29/60 |
| 2006/0269178 | A1 * | 11/2006 | Mascola | F01C 21/02 |
| | | | | 384/107 |
| 2007/0086906 | A1 * | 4/2007 | Horley | F04D 29/22 |
| | | | | 417/423.12 |
| 2007/0253852 | A1 * | 11/2007 | Weber | F04C 15/0042 |
| | | | | 418/48 |
| 2009/0035159 | A1 * | 2/2009 | Speer | F04D 1/063 |
| | | | | 417/365 |
| 2010/0218995 | A1 * | 9/2010 | Sexton | E21B 4/003 |
| | | | | 175/57 |
| 2013/0016935 | A1 * | 1/2013 | Cooley | B23K 26/38 |
| | | | | 384/129 |
| 2014/0254967 | A1 * | 9/2014 | Gonzalez | F16C 33/26 |
| | | | | 384/129 |
| 2015/0211527 | A1 * | 7/2015 | St. John | F04D 29/041 |
| | | | | 417/423.3 |
| 2020/0263680 | A1 * | 8/2020 | Bourne | F04D 29/5866 |
| 2020/0340479 | A1 * | 10/2020 | Felix | F04D 29/0416 |

OTHER PUBLICATIONS

API Plan 32, https://www.aesseal.com/en/resources/api-plans/api-plan-32, downloaded on Dec. 3, 2021, 4 pages.
International Search Report and Written Opinion for PCT/US2022/049632, Feb. 22, 2023, 15 pages.

* cited by examiner

BEARING ASSEMBLIES, APPARATUSES, DEVICES, SYSTEMS, AND METHODS INCLUDING BEARINGS

CROSS-REFERENCE SECTION

This application is a continuation of U.S. patent application Ser. No. 17/549,628, filed on Dec. 13, 2021, the disclosure of which is hereby incorporated in their entirety by reference.

TECHNICAL FIELD

This application relates to bearing assemblies (e.g., thrust bearing assemblies) for use with devices and assemblies such as, for example, fluid-handling devices and assemblies. For example, one or more embodiments of the disclosure may include a thrust bearing assembly that supports a portion of a shaft of another component of a system and includes a fluid pathway for thermal regulating (e.g., cooling) bearings while recirculating fluid for lubrication and/or flushing of any solids around the bearing assembly. In some embodiments, the bearing assemblies may house a shaft of a pump, such as, for example, a horizontal surface pump and related assemblies, apparatuses, systems, and methods.

BACKGROUND

Thrust and bearing apparatuses are commonly used in a variety of mechanical applications. For example, subterranean drilling systems, turbomachinery (e.g., compressors), hydroelectric plants, windmills, cranes, turbine generators, pumps, and power plant machinery may utilize bearing assemblies.

System and devices (e.g., fluid handling systems) may include one or more thrust-bearing and/or bearing apparatuses that are operably coupled to the prime mover (e.g., motor or engine) for carrying loads generated during operation (e.g., rotation). Bearing apparatuses utilized in such systems may each include a stator that does not rotate and a rotor that is surrounded by the stator and that is attached to the output shaft to rotate with the output shaft. The stator and rotor may each include a plurality of superhard bearing elements or inserts in axial and/or radial orientations that act as wear surfaces during rotation of the shaft.

As noted above, thrust-bearing assemblies may be used in horizontal surface pumps that include a thrust bearing assembly coupled to a pump (e.g., a submersible pump). Such submersible pumps may typically be used to artificially lift fluid to the surface in wells such as oil, water, or gas wells. However, fluids may also be pressurized and moved between surface locations and/or transported through a supply line to a tank. In such circumstances, submersible pumps may be used as surface pumps in horizontal pumping systems. Horizontal surface pumps may also be used for hydraulic lift (e.g., jet pump), saltwater disposal, water injection, and other fluid transfer applications. Horizontal pumping assemblies typically include a multistage centrifugal pump horizontally mounted to a skid and driven by an electric motor via a shaft. Such horizontal pumping assemblies are disclosed in U.S. Pat. No. 10,036,398, the disclosure of which is incorporated herein, in its entirety, by this reference.

To handle the thrust of the pump, a standalone thrust chamber is conventionally placed in between the prime mover and the intake of the horizontal pump assembly. Thrust bearings in the thrust chamber are submerged in a cavity of oil and carry the thrust of the pump and maintain shaft alignment. A conventional horizontal surface pump commonly includes hydrodynamic bearings and roller element bearings as thrust bearings. However, roller element bearings wear out relatively quickly due to the high rotational speeds and loads to which the horizontal pumps are subjected. Further, conventional bearings often do not include sufficient surface area to carry the loads required of horizontal surface pumps. Further still, conventional hydrodynamic bearings are often subject to contamination and deterioration of the oil in the thrust chamber. Contamination often leads to bearing failure where the entire thrust chamber of a conventional horizontal pump assembly must be replaced, which is time-consuming and expensive. Deterioration is generally controlled through planned preventative maintenance (e.g., oil replacement or monitoring), which can reduce equipment uptime and increase maintenance expenses.

SUMMARY

Embodiments of the instant disclosure may be directed to bearing assemblies systems, and bearing apparatuses and related methods. According to some embodiments, a bearing apparatus may comprise a bearing housing comprising a fluid inlet for receiving a fluid from an upstream fluid source and a fluid outlet for exiting the fluid to a downstream component coupled to the bearing housing. The bearing housing may define a fluid pathway between the fluid inlet and the fluid outlet. The bearing apparatus may further include one or more bearing elements comprising a superhard material and a shaft extending through at least a portion of the bearing housing, where the shaft is configured to be driven by a prime mover. The one or more bearing element may be configured to support the shaft in an axial and radial direction when the shaft is being operated by the motor. The bearing apparatus may further include a recirculation line extending into the bearing housing. The recirculation line may deliver another fluid into the bearing housing at a location separate from the fluid inlet, where the recirculation line is positioned to pass the fluid through the one or more bearing element.

According to some embodiments, a fluid-handling system may comprise a downstream component and a bearing assembly coupled to the downstream component. The bearing assembly comprising a bearing housing comprising a fluid inlet for receiving a fluid from an upstream fluid source and a fluid outlet for exiting the fluid to the downstream component coupled to the bearing housing, where the bearing housing defines a fluid pathway between the fluid inlet and the fluid outlet. The bearing apparatus may further include a shaft extending through at least a portion of the bearing housing. One or more bearing element may comprise a superhard material, where the one or more bearing element are configured to support the shaft in one or more of an axial direction or a radial direction when the shaft is being operated. The bearing apparatus may further include a recirculation line extending from the downstream component into the bearing housing. The recirculation line is for delivering another fluid into the bearing housing along a secondary fluid pathway that is separate from the fluid pathway of the bearing housing, where the recirculation line is positioned to pass the fluid through the one or more bearing element.

According to some embodiments, methods of using a bearing assembly may include: rotating a shaft extending through a bearing housing; supporting the shaft with bearing elements comprising a superhard material; passing source fluid through the bearing housing along a first fluid pathway extending between a fluid inlet and a fluid outlet; supplying a bearing fluid along a second fluid pathway in fluid communication with the bearing elements; wherein the first fluid pathway exits the bearing housing without encountering the bearing elements; and combining the bearing fluid and the source fluid after the supplying the bearing fluid along the second fluid pathway in fluid communication with the bearing elements.

Features from any of the embodiments contemplated by the instant disclosure may be used in combination with one another, without limitation, in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

DETAILED DESCRIPTION

Figure 1:
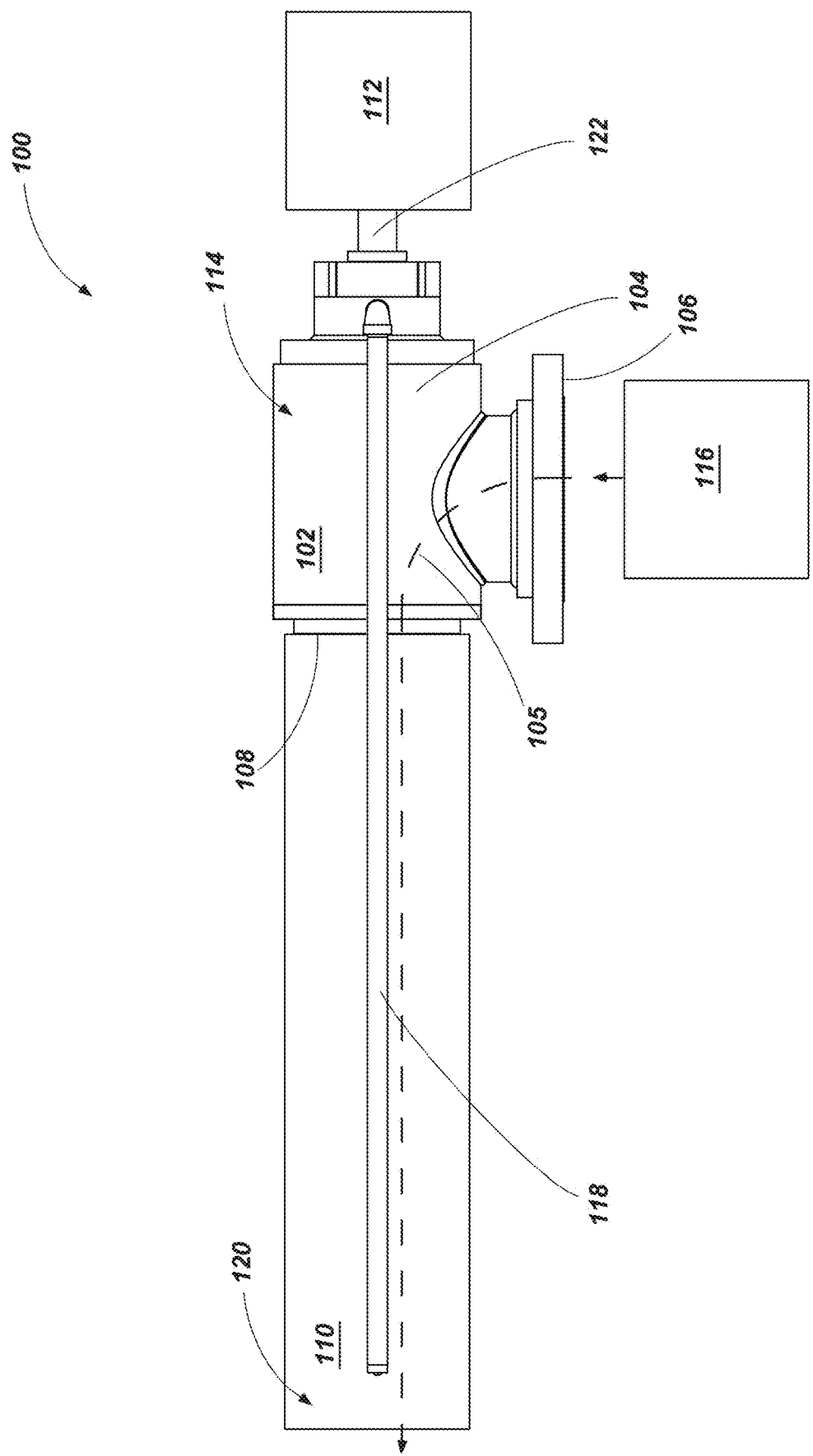
FIG. 1 is a simplified side or elevation view of a fluid-handling system include a bearing apparatus according to an embodiment of the disclosure.

The terms "superabrasive" and "superhard," as used herein, may refer to any material having a hardness that is at least equal to a hardness of tungsten carbide. For example, a superhard article may represent an article of manufacture, at least a portion of which may exhibit a hardness that is equal to or greater than the hardness of tungsten carbide.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical," "lateral," and "radial" refer to the orientations as depicted in the figures.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

Embodiments of the instant disclosure are directed to exemplary bearing assemblies and bearing apparatuses including superhard bearing elements. These bearing apparatuses may include radial bearings, thrust bearings, and other bearings, without limitation, disposed in a housing (e.g., in a combined intake and thrust housing or chamber). Such bearing assemblies and bearing apparatus may be used in a variety of applications, including pumps (e.g., horizontal surface pumps), drilling systems, turbines, windmills, cranes, machinery, pumps, and any other suitable applications, without limitation.

As discussed below in greater detail, the bearing assemblies and bearing apparatuses may include a recirculation feature (e.g., a flushing feature, a lubrication feature, a thermal regulation feature, a feature for delivering process fluid treatment chemicals into the pump assembly through the recirculation line, and/or etc.). For example, the housing of the bearing assembly may include a recirculation flow path supplied by one or more pipes that provides an independent stream of fluid flow (e.g., along a flow path separate from a primary fluid path through the assembly) that acts to cool, lubricate and/or flush the bearing elements of the bearing assembly. In some embodiments, the fluid may be any suitable working fluid, such as, for example, oil, water, hydrocarbons, bromine, combinations thereof, or any other working fluid that may be pumped through the system and that acts to cool, lubricate, and/or flush bearings of the system.

As noted above, wear-resistant, superhard materials may be utilized for bearing elements utilized in the bearing assemblies. In some embodiments, such bearing elements including superhard materials may comprise one or more polycrystalline diamond compacts (PDCs). For example, the bearing elements may include rotor and stator bearing rings (e.g., comprising a metallic material such as steel) that are each configured to accept a number of superhard bearing elements. Each superhard bearing element may include a superhard material (e.g., polycrystalline diamond (PCD)) layer formed on a substrate, such as a cemented tungsten carbide substrate. One or more superhard bearing elements may be attached to a bearing rotor or stator by press-fitting, brazing, or through other suitable methods of attachment. In some embodiments, in a radial bearing, bearing elements attached to a bearing rotor have superhard bearing surfaces configured and oriented radially outward to bear against opposing superhard bearing surfaces of bearing elements attached to a bearing stator that radially surrounds the bearing rotor (or vice versa).

Generally, the instant disclosure relates to the use of superhard sliding bearings between a drive mechanism (e.g., an electric motor) and a pump. For example, some embodiments of the disclosure relate to one or more superhard thrust bearing and/or one or more superhard radial bearing operably coupled to a shaft, the shaft operably coupling a drive mechanism to a pump (e.g., a centrifugal pump, a multistage centrifugal pump, or any suitable pump, without limitation). Some embodiments of the disclosure may provide a bearing apparatus that acts as a thrust absorbing chamber combined with the intake of a horizontally mounted submersible pump (e.g., an electric submersible pump). Polycrystalline diamond (PCD) bearings may be implemented to handle dirty fluids containing solids and other contaminants that traditional bearings cannot. Such a bearing apparatus may enable the PCD bearings to be cooled by process fluid such that the bearings do not need to be isolated (e.g., in a sealed oil bath) to run efficiently. Cooling with the process fluid enables the thrust chamber and the intake to be combined. In some embodiments, such a configuration may utilize a recirculation loop to cool, lubricate, and/or flush the bearings. This recirculation loop takes fluid from the discharge of another component of the system (e.g., a pump located downstream in the process flow) and routes it (e.g., upstream) back through the bearing compartment so there is a positive flow through the bearings. The recirculation flow then comingles with the suction fluid in the primary flow path to be reintroduced to the intake of the pump. In some embodiments, the recirculation flow may be split to accommodate any flushing requirements for the mechanical seal that is attached to the end of the chamber.

Some embodiments of the disclosure may provide bearings that are cooled, lubricated, and/or flushed by the process fluid, such that the need to regularly check bearing oil levels or change the oil is reduced or eliminated. The combination of components and utilization of the process fluid for cooling and/or lubrication may reduce initial material and/or labor costs. By utilizing a recirculation flow, the amount of fluid being routed through the bearing surfaces may be controlled. Such a configuration may safeguard against too little flow (e.g., causing the bearings to overheat and result in premature failure) and/or too much flow (e.g., causing erosion of the bearing surfaces and resulting in premature failure). In addition, optionally, a recirculation flow may be pressurized such that process fluid entering the chamber does not contact the one or more superhard bearings. In some embodiments, the flow of the recirculated fluid may be controlled manually and/or electrically through a variable frequency drive (VFD). In a further optional aspect of the present disclosure, recirculated fluid may be filtered prior to passing through the superhard bearings. Such a configuration may provide extended life to the superhard bearing apparatus.

FIG. 1 is a simplified top view of a fluid-handling system 100 include a bearing assembly or apparatus 102. As illustrated in FIG. 1, the bearing apparatus 102 includes a bearing housing 104 with one or more fluid inlets 106 and fluid outlets 108 where the bearing housing 104 defines a fluid pathway 105 (e.g., a primary fluid pathway provided a primary or source fluid) between the fluid inlet 106 and the fluid outlet 108. In some embodiments, the bearing apparatus 102 may be coupled (e.g., directly or indirectly) to another fluid-handling component of the system 100 (e.g., a pump 110). As depicted, the system 100 may comprise a horizontal pumping system including the pump 110 that is a horizontal surface pump (e.g., a multistage pump, a submersible multistage pump, etc.) oriented substantially in a horizontal direction (e.g., in relation to a surface of the Earth).

It is noted that while embodiments of the disclosure discussed in detail herein relate generally to fluid-handling systems including horizontal surface pumps, other fluid-handling devices (e.g., other pumps, turbines, compressors, etc.) or devices including components that are thermally regulated (e.g., cooled) by one or more fluids may be implemented in additional embodiments.

A motor 112 (e.g., a surface motor, an electric motor, a hydraulic motor, an internal combustion engine, another type of prime mover, etc.) may operate with the pump 110 in a horizontal surface configuration via a shaft that is supported by and extends through the bearing apparatus 102 (e.g., as opposed to a submersible motor that operates with submersible pumps downhole in a vertical pumping configuration). For example, the motor 112 may operate the pump 110 by rotating one or more shafts that run through the length of pump 110 and that are coupled to impellers disposed in respective diffusors of the pump 110.

As noted above, in addition to providing a thrust housing, the bearing housing 104 of the bearing apparatus 102 may define an intake chamber 114 positioned between motor 112 and pump 110. The intake chamber 114 may define the fluid pathway 105 between the fluid inlet 106, which supplies fluid to the system 100 from an upstream fluid source 116 and the fluid outlet 108, which exits fluid from the bearing apparatus 102 in a downstream component (e.g., the pump 110). The fluid may enter the bearing apparatus 102 through the fluid inlet 106. Fluid inlet 106 may be connected to hoses, piping, a container, and/or another fluid source. Once the fluid proceeds through the fluid inlet 106 and enters intake chamber 114, it may then proceed an inlet of the pump 110.

The bearing apparatus 102 may include a secondary fluid source (e.g., supplied via a recirculation line 118) that is at least partially separated from the primary fluid stream (e.g., via the fluid pathway 105) that is supplied to the system 100 from the fluid source 116 through the fluid inlet 106, through the bearing apparatus 102, and to the pump 110. As discussed below in greater detail, the working fluid supplied by the recirculation line 118 may be used in the bearing apparatus 102 (e.g., to thermally regulate and/or lubricate one or more components of the system 100) and may be recirculated from a downstream location of the system 100 (e.g., from the pump 110). For example, fluid that has also passed through the bearing apparatus and traveled through at least a portion of the pump 110 may be returned back to the bearing apparatus 102 to assist in the operation of the bearing apparatus 102.

Such a secondary fluid may be supplied to the bearing apparatus 102 through another fluid pathway. For example, a portion of the fluid that is supplied to the pump 110 (e.g., to be pressurized by the pump 110) may be separated from the primary fluid pathway 105. In some embodiments, the recirculation line 118 may connect into and divert fluid from the primary fluid pathway 105 at a downstream location in the system 100 (e.g., a location proximate an outlet 120 of the pump 110). In such an embodiment where the pump 110 acts to pressurize the fluid, the fluid supplied via recirculation line 118 may be a relatively higher pressure than the remaining fluid in the intake chamber 114 (e.g., the fluid traveling through the intake chamber 114 outside of the cartridge 132 that is supplied from the fluid source 116). The relatively higher-pressure fluid may be used for thermal regulation in the bearing apparatus 102 and then may rejoin the primary fluid pathway 105 to travel through the pump 110 once again.

Figure 2:
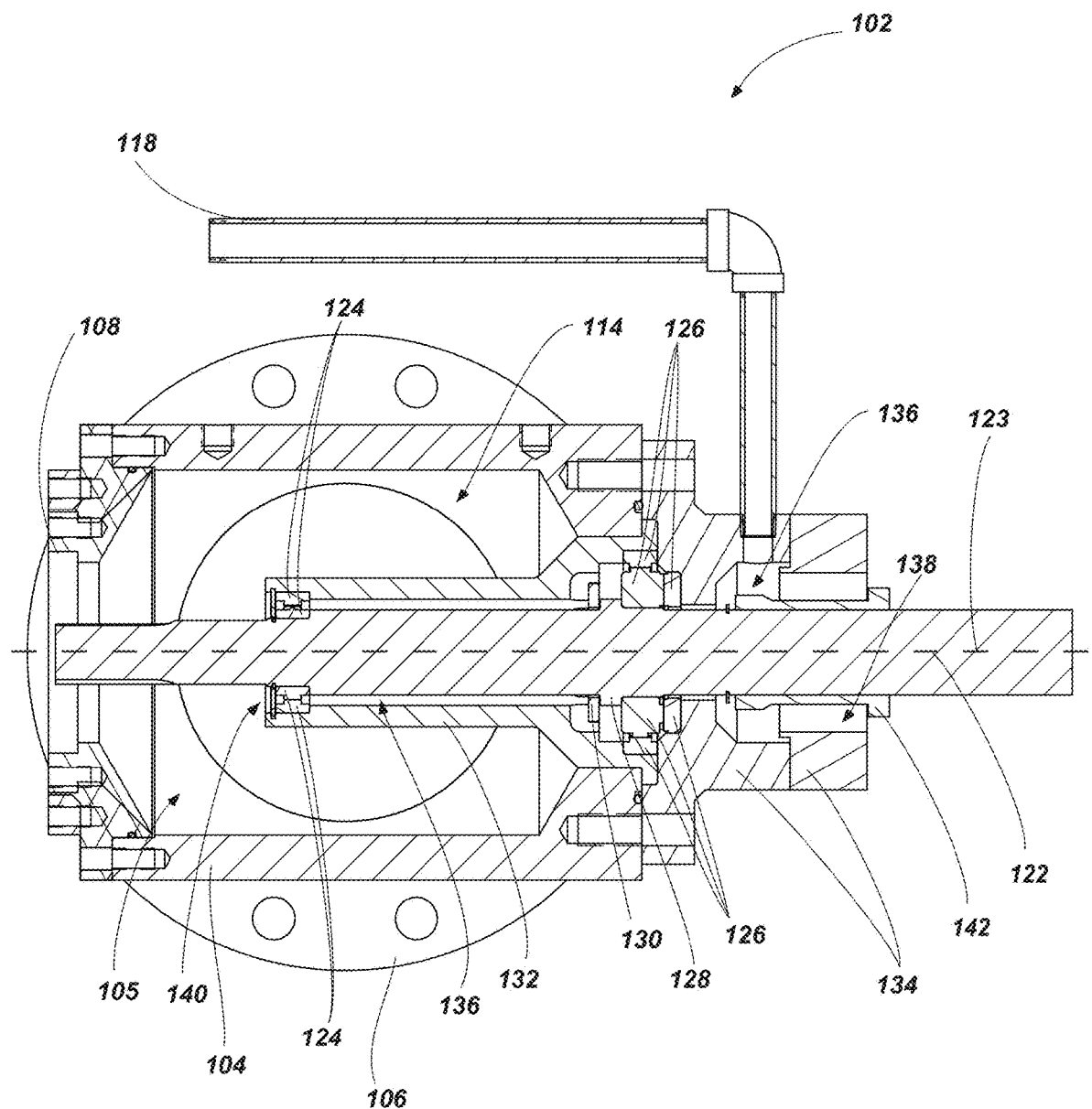
FIG. 2 is a cross-sectional view of a bearing apparatus according to an embodiment of the disclosure.

FIG. 2 is a cross-sectional view of a bearing apparatus (e.g., the bearing apparatus 102 of FIG. 1). As shown in FIGS. 1 and 2, a shaft 122 extends through at least a portion of the bearing housing 104 of the bearing apparatus 102. As discussed above, the shaft 122 may be coupled to a device for moving the shaft 122 (e.g., the motor 112) on one end of the shaft 122. The shaft 122 may extend through the bearing housing 104 and exit the bearing housing 104 (e.g., at the fluid outlet 108) to couple to another component of the system 100 (e.g., the pump 110) that is coupled to the bearing housing 104 at the fluid outlet 108 such that the motor 112 may drive components of the pump 110 via the shaft 122.

As depicted in FIGS. 1 and 2, bearing assemblies or elements may support the shaft 122 within the bearing housing 104 during operation of the shaft 122 (e.g., when rotational forces are applied to the shaft 122 by the motor 112). For example, at a first set of bearings 124 and a second set of bearings 126 may support the shaft 122 in the bearing housing 104. In some embodiments, the first set of bearings 124 may be configured as primarily radial bearings positioned relatively closer to the coupling between the bearing apparatus 102 and the pump 110. The second set of bearings 126 may be at least partially or primarily configured as thrust bearings positioned relatively closer to the coupling between the bearing apparatus 102 and the motor 112.

As discussed below in greater detail, each set of bearings 124, 126 may include complementary support structures (e.g., rings or bodies configured to position and retain superhard bearing materials or superhard wear surfaces) that are respectively coupled to the shaft 122 and the bearing apparatus 102 to enable relative motion between the shaft 122 and the bearing apparatus 102. For example, bearing rings of the set of bearings 124, 126 coupled to the shaft 122 may rotate while additional bearing rings of the set of bearings 124, 126 may be held stationary in the bearing housing 104.

The combination thrust/radial bearings 126 may act to support the shaft 122 in a configuration where the thrust/radial bearings 126 support and contact a portion of the shaft 122 (e.g., a thrust collar 128) in primarily an axial direction (along rotational axis 123). As discussed below, in some embodiments, the thrust/radial bearings 126 may also include a radial component where the bearings 126 support the shaft 122 in a radial direction (e.g., with respect to displacement of the central axis of shaft 122 from rotational axis 123). In such an embodiment, the bearings 126 may support the shaft 122 in both a thrust and a radial configuration.

In some embodiments, the bearing apparatus 102 may include an additional bearing or wear surface (e.g., upthrust wear ring 130) to at least partially restrict and/or prevent movement of the shaft 122 (e.g., movement in an axial direction toward the pump 110). For example, the upthrust wear ring 130 may restrict movement of the shaft 122 in the event that the shaft 122 is forced in a direction toward the pump 110 (e.g., during an event, such as a startup, where the shaft 122 is more likely to move against the forces of fluid flow and/or the pressure gradient formed through the pump 110).

The shaft 122 may be positioned in the bearing housing 104 where a portion of the shaft 122 is partially encompassed or surrounded by a cartridge 132 that holds one or more of the bearings 124, 126. The shaft 122 may be secured in the cartridge 132 by bearing retainer 134 (e.g., bell retainer that is bolted to the bearing housing 104 and carries the thrust loads applied by the shaft 122). As depicted, a majority of the bearings 124, 126 may be enclosed around the shaft 122 by the bearing retainer 134 and the cartridge 132. The cartridge 132 and the bearing retainer 134 may at least partially define secondary fluid pathways 136 extending along and about the shaft 122 and the bearings 124, 126. As depicted, the cartridge 132 may slide into the bearing housing 104 where a flange of the cartridge 132 abuts the bearing housing 104 and the cartridge 132 is secured in place by the bearing retainer 134.

As discussed above, a secondary fluid pathway 136, which is secondary and separate in relation to the primary fluid pathway 105, may be supplied to the bearings 124, 126 from a secondary fluid source (e.g., the recirculation line 118). The fluid may be supplied to the bearing housing 104 by the recirculation line 118 along the secondary fluid pathway 136 at a location proximate the coupling of the motor 112 to the bearing apparatus 102. For example, the recirculation line 118 may extend into the bearing retainer 134 at a cavity 138 (e.g., defined by the bearing retainer 134) that may house a mechanical seal 142 between the motor 112 to the bearing apparatus 102. For example, the mechanical seal 142 may extend about the shaft 122, where the shaft 122 extends through the cavity 138. The cavity 138 may define a portion of the secondary fluid pathway 136 that extends around the mechanical seal 142 as the mechanical seal 142 encompasses the shaft 122.

As noted above, in some embodiments, some of the fluid may be directed to cool and/or lubricate the mechanical seal 142.

After being supplied to the cavity 138, the recirculated fluid may travel along the shaft 122 into the cartridge 132 and to the thrust/radial bearings 126 (e.g., in order to at least partially thermally regulate (e.g., cool and/or lubricate) and/or lubricate the thrust/radial bearings 126). The recirculated fluid may then be directed to the radial bearings 124 (e.g., traveling around the thrust collar 128 to at least partially thermally regulate and/or lubricate the radial bearings 124). The recirculated fluid may exit the cartridge 132 at opening 140 and rejoin the fluid in the primary fluid pathway 105.

Figure 3:
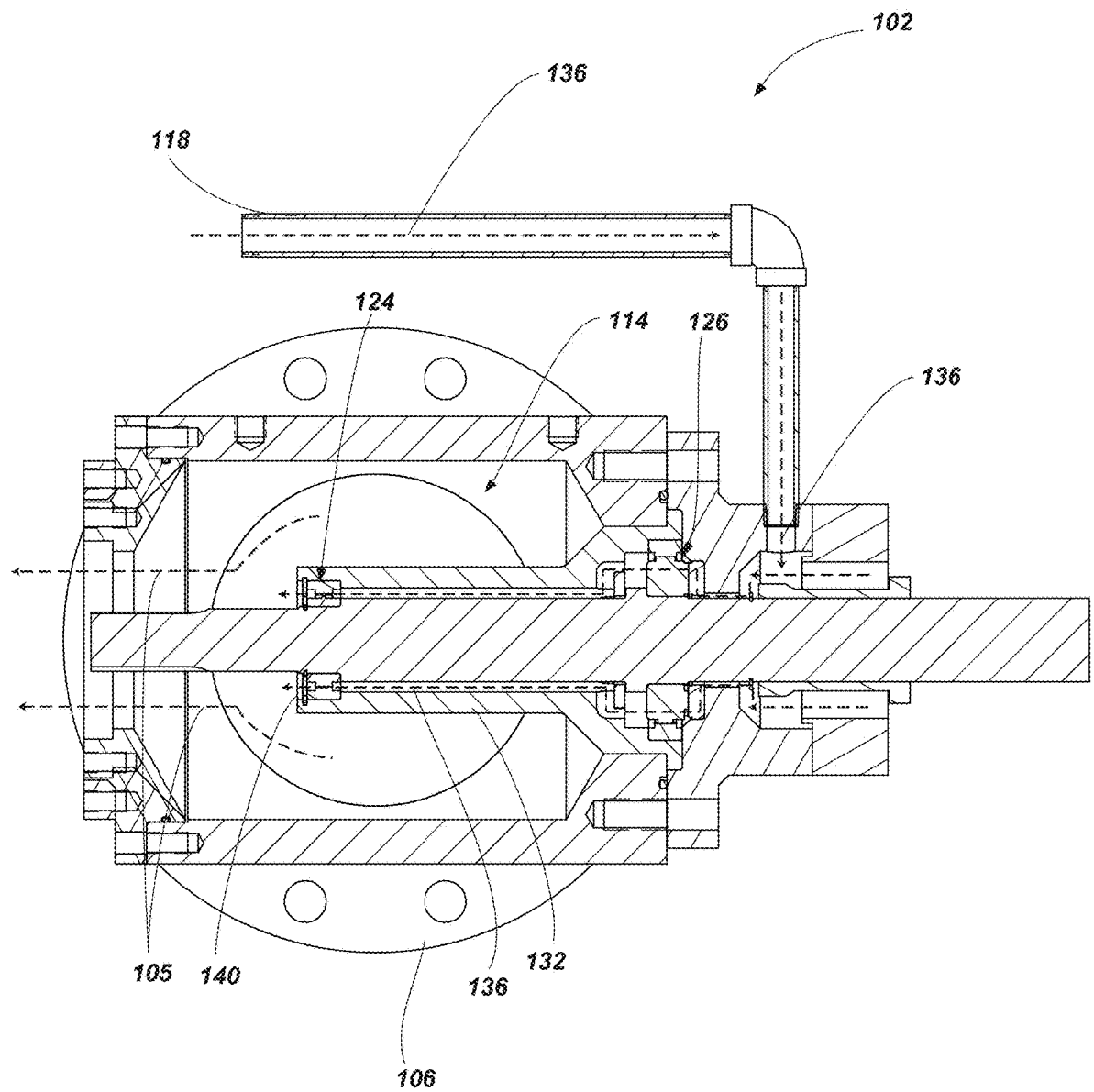
FIG. 3 is a cross-sectional view of a bearing apparatus illustrating fluid pathways according to an embodiment of the disclosure.

FIG. 3 is a cross-sectional view of a bearing apparatus (e.g., bearing apparatus 102 as shown in FIG. 1) illustrating fluid pathways. Referring to FIGS. 1 and 3, a pumped fluid (e.g., source fluid) travels along primary fluid pathway 105. The pumped fluid enters through fluid inlet 106, proceeds into intake chamber 114, and may proceed directly into pump 110. At a downstream location (e.g., proximate an outlet of the pump 110), a portion of the pumped fluid (e.g., bearing fluid) traveling in the primary fluid pathway 105 may be recirculated back to the bearing apparatus 102 along secondary fluid pathway 136 through the recirculation line 118. The recirculated fluid flows through the cartridge 132 around, about, and/or through bearings 124, 126, lubricating and cooling the bearing set 124, 126. After passing through the bearing set 124, 126 the recirculated bearing fluid may exit the cartridge 132 at opening 140 and rejoin the pumped fluid traveling along the primary fluid pathway 105 as the fluid enters pump 110.

Figure 4:
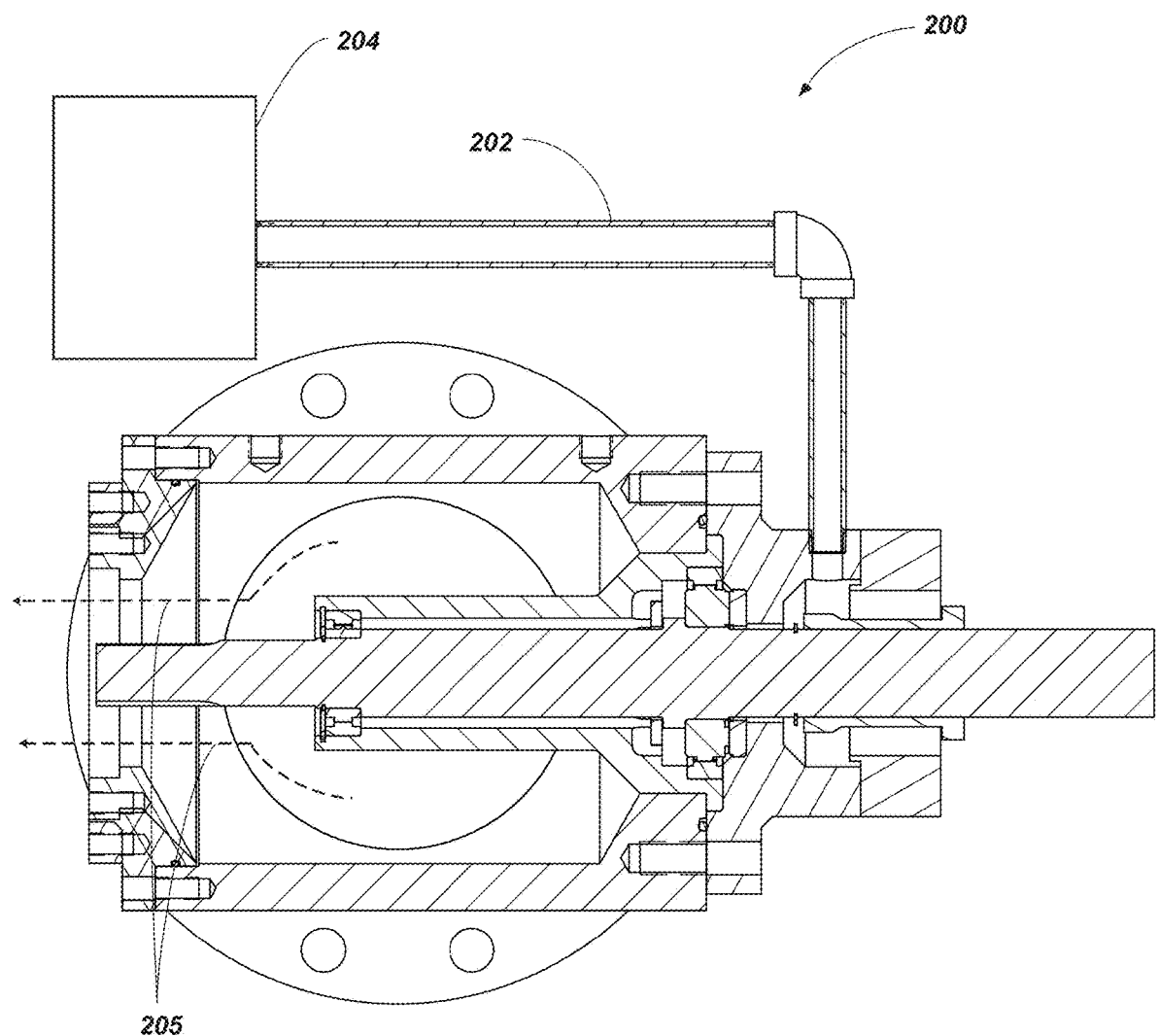
FIG. 4 is a cross-sectional view of a bearing apparatus according to an embodiment of the disclosure.

FIG. 4 is a cross-sectional view of a bearing apparatus 200, which may be similar or substantially the same as, and include one or more of the components of, the other bearing apparatus disclosed herein. As shown in FIG. 4, rather than being recirculated, secondary fluid (e.g., bearing fluid) may supplied from secondary fluid supply line 202. Such bearing fluid may be water, oil, and/or any other suitable fluid that is provided from an external source 204 (e.g., a reservoir, a pump, etc.). Such bearing fluid may be selected to be compatible with the source fluid flowing in the primary fluid pathway 205 and/or may be capable of being separated from the source fluid. For example, the bearing fluid may be capable of and/or suitable for being provided through a downstream component (e.g., the pump 110 (FIG. 1)) with the source fluid in the primary fluid pathway 205. By way of further example, the bearing fluid may be filtered or otherwise separated out downstream and disposed of or, after being separated, may be provided back to the bearing apparatus 200 through the secondary fluid supply line 202.

Figure 5:
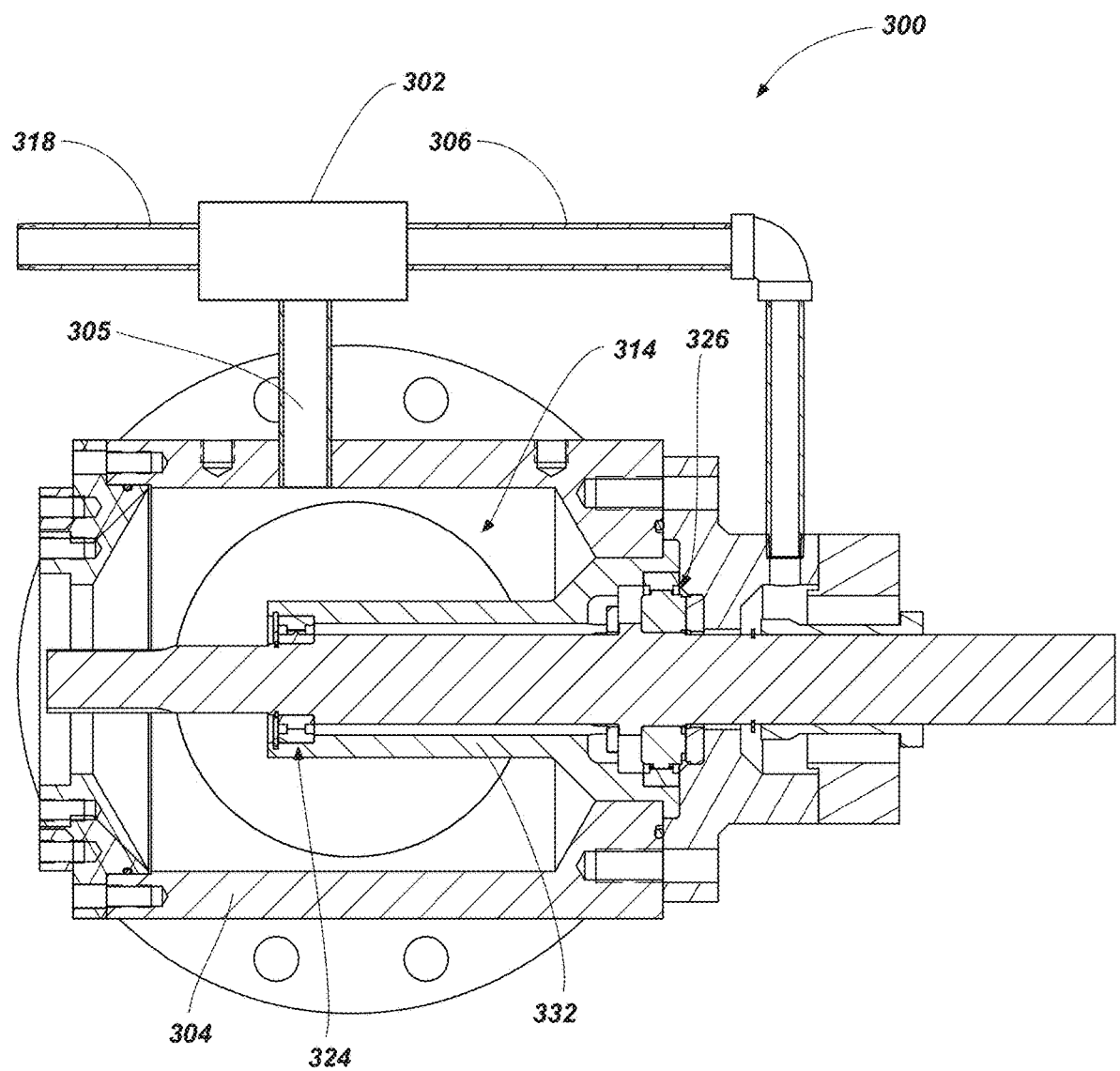
FIG. 5 is a cross-sectional view of a bearing apparatus according to an embodiment of the disclosure.

FIG. 5 is a cross-sectional view of a bearing apparatus 300, which may be similar or substantially the same as, and include one or more of the components of, the other bearing apparatus disclosed herein. As shown in FIG. 5, bearing apparatus 300 may include a filter 302 that may be used to filter the recirculated fluid (e.g., supplied by recirculation line 318) before it is supplied to the bearings 324, 326 (e.g., supplied into the cartridge 332). For example, the filter 302 (e.g., a cyclone separator, a scrubber, and/or other type of filtration) may receive the fluid from the recirculation line 318 and separate the recirculated fluid into multiple fluid streams. The separate fluid streams may include a dirty fluid line 305 (e.g., containing particular or other contaminants) and a substantially clean fluid line 306. The clean fluid line 306 may supply clean filtered fluid, which has been processed by the filter 302, into the bearing housing 304 and the cartridge 332 to interact with the bearings 324, 326. The dirty fluid line 305 may return the dirty fluid to other portions of the system or may remove the dirty fluid from circulation. For example, the dirty fluid line 305 may return the dirty fluid back to an intake chamber 314 of the bearing apparatus 300.

Figure 6:
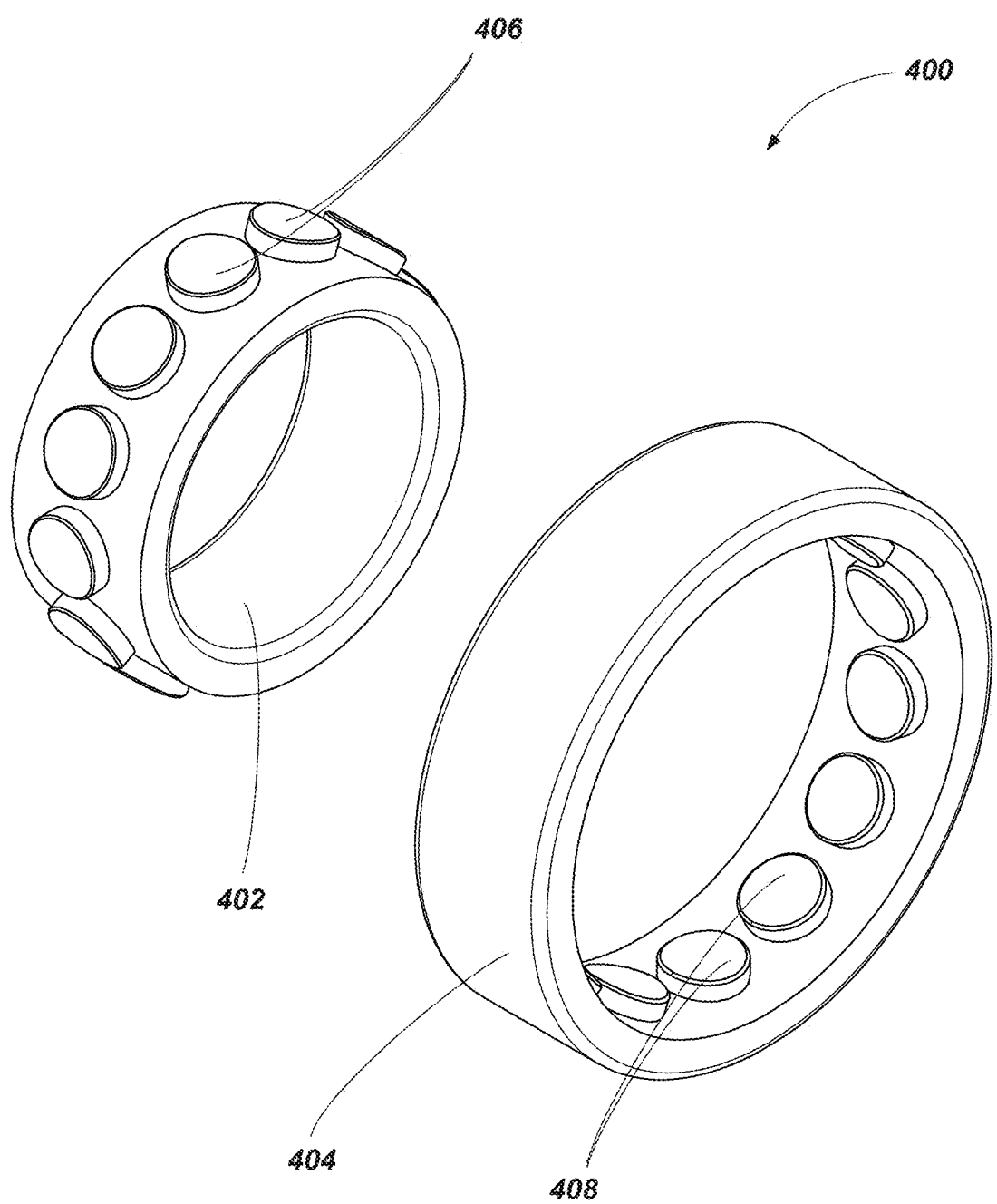
FIG. 6 is an exploded perspective view of a bearing assembly according to an embodiment of the disclosure.

FIG. 6 is an exploded perspective view of a bearing assembly 400 that may be used in the systems and/or components discussed above (e.g., comprising the bearings 124, 126 (FIG. 2)). As shown in FIG. 6, the bearing assembly 400 may be configured as a radial bearing where the bearing assembly 400 is configured to primarily support loads in a radial or lateral direction.

The bearing assembly 400 may include a first support structure 402 and a second support structure 404. In some embodiments, the first support structure 402 and/or second support structure 404 may comprise a metallic material (e.g., carbon steel, titanium or titanium alloys, tungsten or tungsten alloys, aluminum or aluminum alloys, or stainless steel, etc.), a carbide material (e.g., tungsten carbide, silicon carbide, etc.), or any other suitable material. In some embodiments, the first support structure 402 and/or the second support structure 404 may comprise a material with relatively high thermal conductivity (e.g., a thermal conductivity equal to or exceeding tungsten carbide or cobalt-cemented tungsten carbide) to enhance the ability of the support structures 402, 404 to dissipate heat energy from wear elements of the bearing assembly 400.

As discussed above, the first support structure 402 may comprise an inner structure that is coupled to the shaft 122 (FIG. 2) and rotates relative to the second support structure 404 comprising an outer structure that is coupled to a portion of the bearing housing 104 (e.g., the cartridge 132).

Bearing elements 406, 408 (e.g., wear surfaces or elements) may be coupled to each of the first support structure 402 and second support structure 404. As discussed above, one or more of the bearing elements 406, 408 may comprise polycrystalline diamond (PCD) wear surfaces. For example, the bearing elements 406, 408 may comprise polycrystalline diamond compacts (PDCs) including a superhard table on a substrate that is coupled to one of the first support structure 402 and the second support structure 404. In at least one embodiment, the substrate may comprise a cemented carbide material, such as a cobalt-cemented tungsten carbide material and/or any other suitable material. The superhard table may be formed of any suitable superabrasive and/or superhard material or combination of materials, including, for example, PCD. Any of the superhard tables disclosed herein may also comprise polycrystalline diamond materials, such as those disclosed in U.S. Pat. No. 7,866,418, the disclosure of which is incorporated herein, in its entirety, by this reference. According to additional embodiments, the superhard table may comprise cubic boron nitride, silicon carbide, polycrystalline diamond, and/or mixtures or composites including one or more of the foregoing materials, without limitation.

Figure 7:
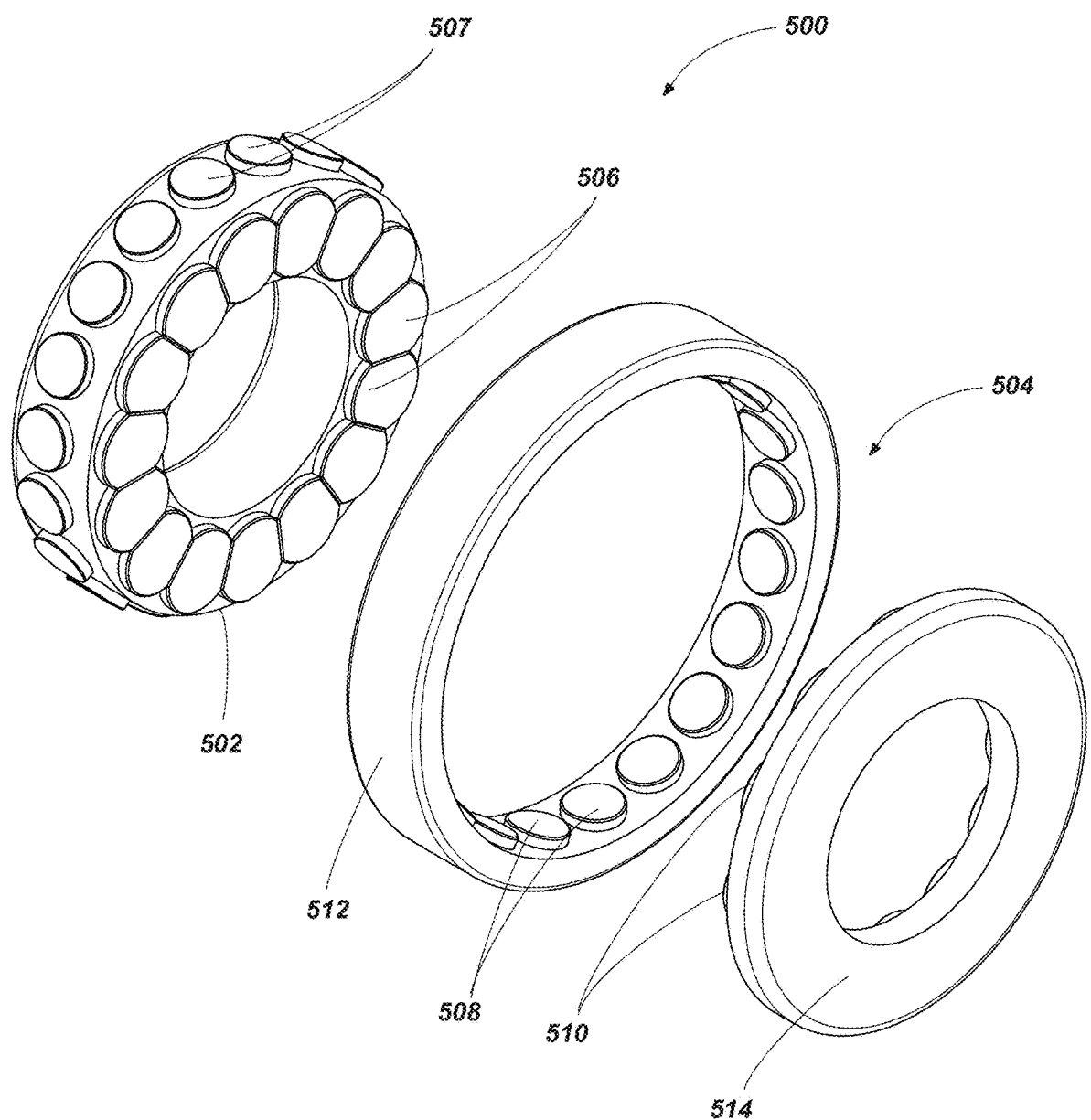
FIG. 7 is an exploded perspective view of a bearing assembly according to an embodiment of the disclosure.

FIG. 7 is an exploded perspective view of a bearing assembly 500 or assembly that may be used in the systems and/or apparatus discussed above (e.g., comprising the bearings 124, 126 (FIG. 2)). As shown in FIG. 7, the bearing assembly 500 may be configured as both a radial and a thrust bearing where the bearing assembly 500 supports loads in both a radial or lateral direction and an axial direction. In additional embodiments, the outer circumference of bearing elements 507 may be omitted to provide a bearing assembly for use primarily in a thrust configuration.

The bearing assembly 500 may include first support structure 502 and second support structure 504, which may be similar to the support structures discussed above. As discussed above, the first support structure 502 may comprise an inner structure that is coupled to the shaft 122 (FIG. 2) and rotates relative to the second support structure 504 comprising an outer structure that is coupled to a portion of the bearing housing 104 (e.g., the bearing retainer 134).

Bearing elements 506, 507, 508, 510 may be coupled to each of the first support structure 502 and second support structure 504. As discussed above, one or more of the bearing elements 506, 507, 508, 510 may comprise polycrystalline diamond (PCD) wear surfaces and may be similar to those discussed above. For example, the bearing elements 506, 507, 508, 510 may be polycrystalline diamond compacts including a superhard table formed on a substrate that is coupled to one of the first support structure 502 and the second support structure 504.

As depicted, the first support structure 502 may include the bearing elements 507, 506 on both the circumference of the first support structure 502 (e.g., radial bearings) and on an axial end of the first support structure 502 (e.g., thrust bearings), respectively.

The second support structure 504 may include complementary bearing elements 508 that align with the radial and thrust bearings features of the first support structure 502. As depicted, the second support structure 504 may include two separate portions 512, 514 where a first portion 512 supports the radial bearing elements 508 and the second portion 514 supports the thrust bearing elements 510. In some embodiments, the second support structure 504 may be a unitary structure with both the radial bearing elements 508 and the thrust bearing elements 510 are supported by a single support structure 504 that is a combination of portions 512, 514.

Figure 8:
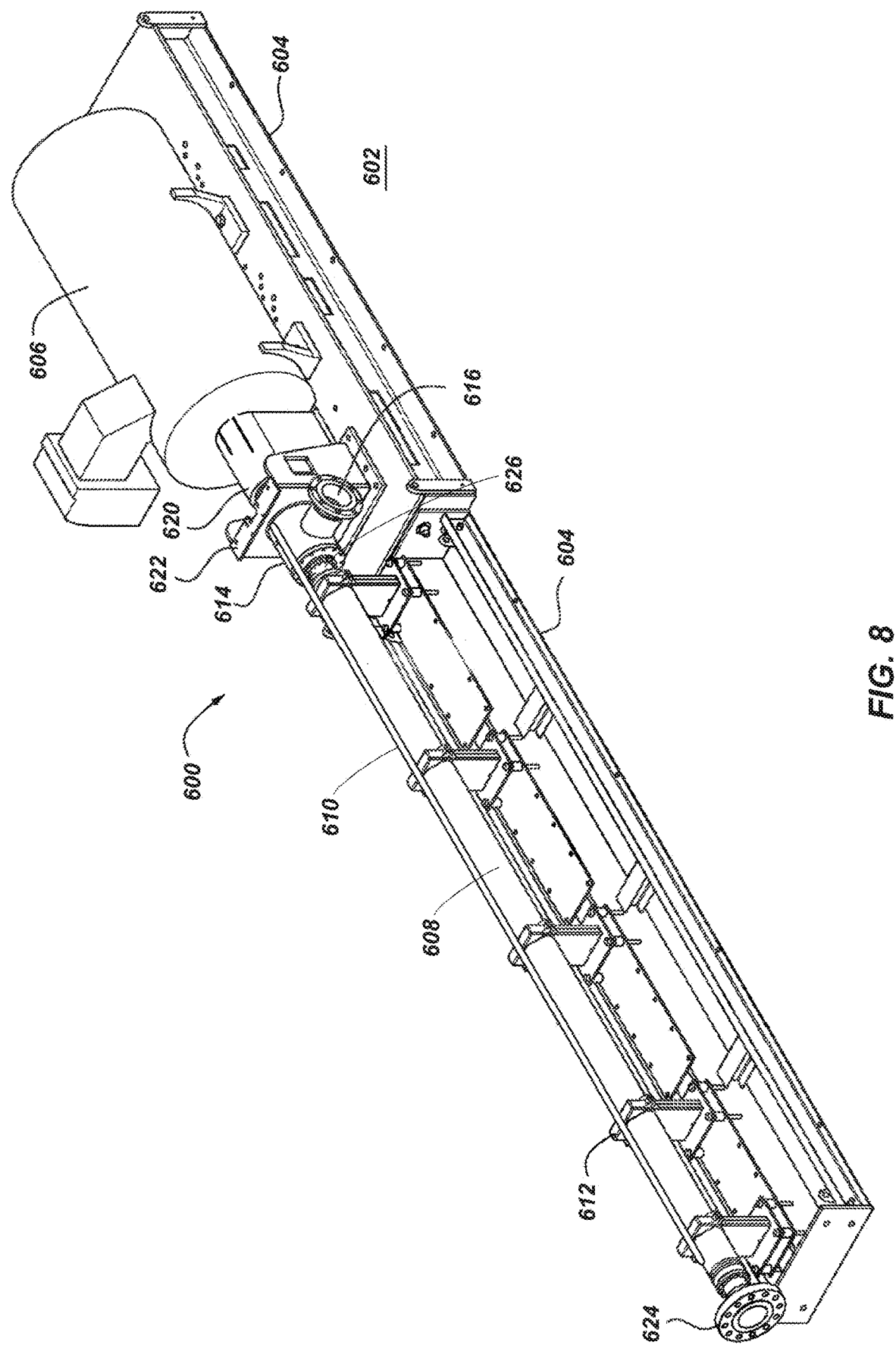
FIG. 8 is perspective view of a horizontal surface pump assembly according to an embodiment of the disclosure

FIG. 8 is perspective view of a horizontal surface pump assembly 600. As shown in FIG. 8, the horizontal surface pump assembly 600 is oriented substantially horizontally on surface 602, such that the length of assembly 600 is resting on (e.g., substantially parallel with) the surface 602. Pump assembly 600 may be mounted on one or more skids 604, such as a pump skid and/or a motor skid, and secured within saddles 612. A prime mover (e.g., motor 606) may rotate the shafts that run through the center of the length of pump assembly 600.

The horizontal surface pump assembly 600 may include an electric submersible pump 608 configured as a multi-stage centrifugal pump conventionally used in downhole electric submersible pump (ESP) assemblies, but instead implemented here in a horizontal surface pump application.

Intake chamber 614 may extend between motor 606 and pump 608, may be connected to motor 606 by way of a flex or disc coupling, and may serve as the intake for pump 608. The intake chamber 614 may be similar or substantially the same as, and include one or more of the components of, the bearing apparatus disclosed herein (e.g., bearing apparatus 102, 200, 300) including a recirculation line 610. As above, the intake chamber 614 may also include bearings for carrying thrust and providing radial support, serving in a dual intake and thrust capacity. Motor coupling cover 620 may secure motor 606 and intake chamber 614 together, whilst intake chamber bracket 622 may support intake chamber 614 and assist in holding intake chamber 614 in place.

Pumped fluid may enter assembly 600 through fluid entrance 616 of intake chamber 614. Fluid entrance 616 may be connected to hoses, piping, a container, and/or a fluid source. Once fluid proceeds through fluid entrance 616 and enters intake chamber 614, it may then proceed to pump inlet 626. In the process of passing from fluid entrance 616 to pump inlet 626, the working fluid may flow around, about and/or through thrust bearings of illustrative embodiments. From pump inlet 626, fluid may continue through pump 608 to pump discharge 624, after which the fluid is transported to its destination. A portion of fluid from discharge 624 may be routed back into the intake chamber 614 with the recirculation line 610. Fluid exiting the recirculation line 610 into the intake chamber 614 may be employed to cool, flush, and/or lubricate radial support bearings, thrust bearings, and/or mechanical seals in, or in communication with, the intake chamber 614.

Terms of degree (e.g., "about," "substantially," "generally," etc.) indicate structurally or functionally insignificant variations. In an example, when the term of degree is included with a term indicating quantity, the term of degree is interpreted to mean±10%, ±5%, or +2% of the term indicating quantity. In an example, when the term of degree is used to modify a shape, the term of degree indicates that the shape being modified by the term of degree has the appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, et cetera.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. Further, the words "including," "having," and variants thereof (e.g., "includes" and "has") as used herein, including the claims, shall be open-ended and have the same meaning as the word "comprising" and variants thereof (e.g., "comprise" and "comprises"). In addition, features from one embodiment may be combined with features of another embodiment while still being encompassed within the scope of the disclosure as contemplated by the inventors.

What is claimed is:

1. A fluid-handling system, comprising:
a pump; and
a bearing assembly coupled to the pump, the bearing assembly comprising:
a housing comprising:
a fluid inlet for receiving a primary fluid from an upstream fluid source; and
a fluid outlet for exiting the primary fluid to the pump coupled to the housing, the housing defining a primary fluid pathway between the fluid inlet and the fluid outlet;
an inner bearing housing positioned at least partially within the primary fluid pathway;
a shaft extending through at least a portion of the housing and through at least a portion of the inner bearing housing;
one or more bearing elements comprising a superhard material in the inner bearing housing, the one or more bearing elements configured to support the shaft in one or more of an axial direction or a radial direction when the shaft is being operated; and
a recirculation line extending from the pump into the housing, the recirculation line for delivering another fluid into the housing along a secondary fluid pathway that is separate from the primary fluid pathway of the housing, the recirculation line positioned to pass the another fluid through the one or more bearing elements, wherein the inner bearing housing is configured to substantially isolate the one or more bearing elements from the primary fluid traveling through the primary fluid pathway such that a majority of fluid in communication with the one or more bearing elements comprises only the another fluid from the secondary fluid pathway.

2. The fluid-handling system of claim 1, wherein the inner bearing housing is configured to supply the another fluid from the secondary fluid pathway to each of the one or more bearing elements along an axial length of the inner bearing housing while isolating the one or more bearing elements from the primary fluid of the primary fluid pathway.

3. The fluid-handling system of claim 2, wherein the inner bearing housing is configured to only supply the another fluid from the secondary fluid pathway to the one or more bearing elements along the axial length of the inner bearing housing between entrance of the inner bearing housing and an exit of the inner bearing housing.

4. The fluid-handling system of claim 1, wherein the inner bearing housing is configured to enable the another fluid to exit the inner bearing housing and to enter the primary fluid pathway and mix with the primary fluid after passing each of the one or more bearing elements in the inner bearing housing.

5. The fluid-handling system of claim 4, wherein the inner bearing housing is configured to supply the another fluid from the secondary fluid pathway to all of the one or more bearing elements in the inner bearing housing while isolating the one or more bearing elements from the primary fluid of the primary fluid pathway before exiting the another fluid from the inner bearing housing.

6. The fluid-handling system of claim 1, wherein at least one bearing element of the one or more bearing elements comprises both thrust bearings and radial bearings.

7. The fluid-handling system of claim 6, wherein the thrust bearings and the radial bearings are both disposed on an inner bearing carrier with an outer bearing carrier configured to move relative to the inner bearing carrier.

8. The fluid-handling system of claim 1, wherein the inner bearing housing radially surrounds and encloses each bearing element of the one or more bearing elements.

9. The fluid-handling system of claim 1, wherein the inner bearing housing is configured to exit the another fluid from the secondary fluid pathway from the inner bearing housing at a pressure higher than the primary fluid in order to at least partially prevent the primary fluid from entering the inner bearing housing.

10. The fluid-handling system of claim 1, wherein the pump comprises a multistage horizontal surface pump.

11. A bearing assembly, comprising:
a housing comprising:
   a primary fluid inlet for receiving a primary fluid from an upstream fluid source; and
   a primary fluid outlet for exiting the primary fluid to a downstream component coupled to the housing, the housing defining a primary fluid pathway between the primary fluid inlet and the primary fluid outlet;
a shaft extending through at least a portion of the housing, the shaft configured to be driven by a motor;
one or more bearing elements configured to support the shaft in an axial and radial direction when the shaft is being operated by the motor;
a recirculation line extending into the housing, the recirculation line for delivering secondary fluid into the housing at a location separate from the primary fluid inlet, the recirculation line positioned to pass the secondary fluid through the one or more bearing elements; and
an inner housing enclosing at least a portion of the shaft and each of the one or more bearing elements, the inner housing configured to inhibit the primary fluid from entering into the inner housing between a secondary fluid inlet for receiving the secondary fluid from the recirculation line and a secondary fluid outlet for outputting the secondary fluid into the primary fluid pathway.

12. The bearing assembly of claim 11, wherein the inner housing is configured to exit the secondary fluid exhibiting a relatively higher pressure than the primary fluid from the secondary fluid outlet to inhibit the primary fluid from entering the inner housing through the secondary fluid outlet.

13. The bearing assembly of claim 11, wherein at least one bearing element of the one or more bearing elements comprises both thrust bearings and radial bearings on a single bearing carrier.

14. The bearing assembly of claim 11, wherein the inner housing radially surrounds and encloses each bearing element of the one or more bearing elements between the secondary fluid inlet and the secondary fluid outlet.

15. The bearing assembly of claim 11, wherein the downstream component comprises a pump having a lower pressure fluid inlet and a higher-pressure fluid outlet, the recirculation line configured to direct the secondary fluid from a location proximate the higher-pressure fluid outlet of the pump to the housing, the secondary fluid exhibiting a relatively higher pressure than the primary fluid entering through the primary fluid inlet of the housing.

16. A method of using a bearing assembly, the method comprising:
rotating a shaft extending through a housing;
supporting the shaft with bearing elements comprising a superhard material;
passing source fluid through the housing along a first fluid pathway extending between a fluid inlet and a fluid outlet;
supplying a bearing fluid along a second fluid pathway in fluid communication with the bearing elements, the second fluid pathway extending through an enclosed inner bearing housing having a fluid inlet for receiving the bearing fluid and a fluid exit for exiting the bearing fluid into the first fluid pathway;
preventing the source fluid from entering the enclosed inner bearing housing between the fluid inlet and the fluid outlet; and
combining the bearing fluid and the source fluid after the supplying the bearing fluid along the second fluid pathway in fluid communication with the bearing elements.

17. The method of claim 16, further comprising supplying the bearing fluid along the second fluid pathway at an increased pressure that is greater than a pressure of the source fluid passing through the bearing assembly.

18. The method of claim 17, further comprising preventing the source fluid from entering the enclosed inner bearing housing at the fluid exit with the bearing fluid exiting the enclosed inner bearing housing at the fluid exit having the increased pressure of the bearing fluid.

19. The method of claim 16, further comprising supplying the bearing fluid from a location proximate an outlet of a multistage pressure pump into a recirculation supply pipe.

20. The method of claim 16, further comprising supporting the shaft with a bearing element of the bearing elements comprising combined radial bearings and thrust bearings.

* * * * *